Dec. 10, 1935.    M. KAHN    2,024,102
BUMPER UNIT FOR DOORS AND THE LIKE
Filed March 5, 1934
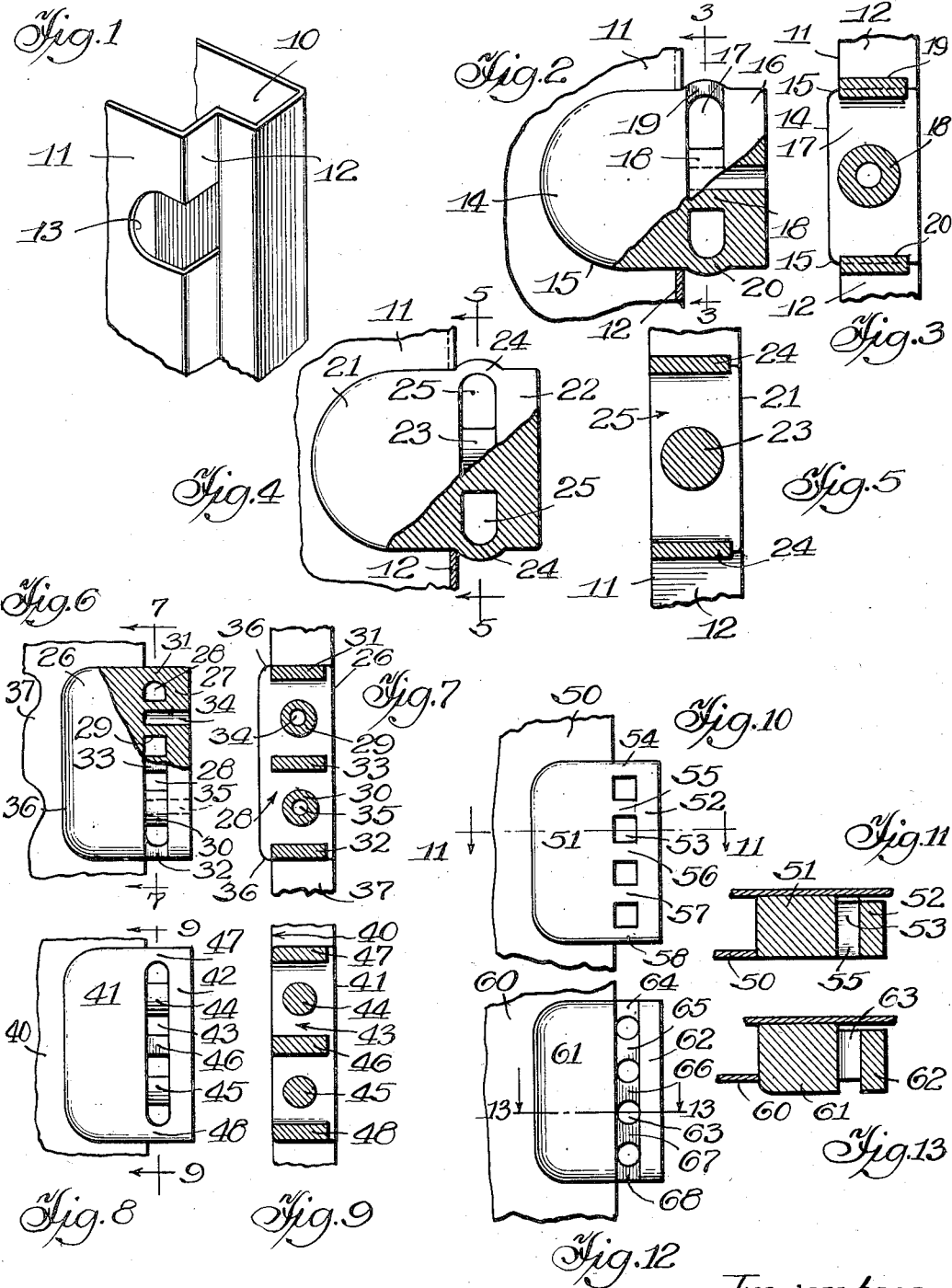
Witness:
Chas. R. Koursh
Inventor,
Mandel Kahn,
By W. Bartlett Jones, Atty.

Patented Dec. 10, 1935

2,024,102

UNITED STATES PATENT OFFICE 2,024,102

BUMPER UNIT FOR DOORS AND THE LIKE

Mandel Kahn, Chicago, Ill., assignor to Harry H. Kahn, Wilmette, Ill.

Application March 5, 1934, Serial No. 714,049

4 Claims. (Cl. 16—86)

The present invention relates to door bumpers, particularly for automobiles, but useful elsewhere.

Heretofore it has been a practice to provide in automobile door posts a socket, and in the socket a rubber block extending beyond the confines of the socket to provide projecting rubber in the path of the door. Various types of sockets, mounting means and rubber blocks are in use or are described for this general purpose. A disadvantage of such construction is the solidity of the rubber and a resulting stiffness in the resiliency. The blocks are nearly all solid forms and the major part within the socket together with the part outside of the socket act as a resilient unit. Where doors are out of line or are sprung, it frequently happens that one part of the block first receives the force of the door, and in further functioning is so overcompressed that it soon becomes permanently and locally injured or scarred, with deformation of the block. In such devices the shock-receiving part is the end of a block, the inward extension of which part receives the shock.

The present invention aims to correct these defects in devices of similar character, but because of the different principles employed the present invention provides a distinctly new type of bumper block and may be embodied in forms not at all like the prior art devices upon which it improves. However, because of the many automobiles now made which are equipped with posts having sockets adapted to hold prior art bumpers, it is preferable to embody the present invention in forms physically adapted to fit into said sockets, although the functioning of the parts within said sockets is of an entirely different character.

It is an object of the invention to provide a bumper having a movable shock-receiving member and resilient means for resisting its motion.

A particular object is the provision of a mounting body and flexible tie means secured to the body for carrying and supporting the shock-receiving part.

Another object of the invention is the provision of resilient resistors secured to both the body and the shock-receiving part which act also as the means by which the shock-receiving part is carried and supported by the mounting body.

A particular object of the invention is the provision of a shock-receiving part spaced from the mounting body which carries it, by a space through which the movable part moves as a separate part toward the mounting body in its buffer action.

Another object of the invention is the provision of a movable flexible shock-receiving part.

Still another object of the invention is the provision of a flexible resilient rubber composition for the shock-receiving part and for the resilient means, the two being preferably integral.

Another object is the formation of an integral resilient rubber unit having the characteristics above referred to.

Still another and important object of the invention is to provide a bumper in which the resiliency is in a plurality of spaced rubber members which are free to expand laterally into a space into which the shock-receiving part tends to move.

Various other and ancillary objects and advantages of the invention will become apparent from the following description of the invention as it is described with reference to several embodiments shown in the accompanying drawing, in which:

Fig. 1 represents a door post of an automobile having a socket formed therein for receipt of a door bumper.

Fig. 2 represents a face view of a door bumper, partly in section, as it is related to a door post like that in Fig. 1.

Fig. 3 is a cross-section of the bumper of Fig. 2, taken on line 3—3 of Fig. 2.

Figs. 4 and 5 are views similar to Figs. 2 and 3 showing a slightly modified form of the bumper of Fig. 2.

Figs. 6 and 7, and Figs. 8 and 9 are pairs of views similar to Figs. 2 and 3, showing other modified forms.

Fig. 10 is a view similar to Fig. 2 showing a form in which a plurality of spaced rubber columns act as the resilient means.

Fig. 11 is a cross-section of the form shown in Fig. 10 taken on line 11—11 of Fig. 10.

Fig. 12 is a view similar to Fig. 2 showing a form much like that of Fig. 11 in which cylindrical holes provide the spaced columns of rubber.

Fig. 13 is a cross-section of the form shown in Fig. 12 taken on line 13—13 of Fig. 12.

The devices shown in the drawing are merely illustrative of forms of the invention which are now preferred, and are designed with reference to use as replacements in existing sockets. The invention is subject to embodiments in different forms, particularly with respect to the design, form and character of the mounting body, or part described as being mounted in the socket, in case a different post, or no socket, is provided.

In Fig. 1 there is shown a door post 10 having sheet metal providing jamb faces 11 and 12 which are cut away to form a socket 13. The character, shape and size of the socket may differ and the socket shown is not essentially specific for use of the present invention. The drawing discloses some bumpers which are made for the socket shown and others which may fit different sockets.

In the prior art, bumper blocks have been made to fit into a socket, and some are provided with an over-reaching part or flange to cover edges of the metal forming the socket. In the present instance such flanges are omitted, but they may be employed if desired. Blocks may set into the socket to lie flush with the face 11, or to project slightly therefrom with neatly rounded edges.

The present invention provides a device having a mounting body, a shock-receiving part and flexible and/or compressible means connecting the two together in such a way that the shock-receiving part is effectively supported and carried by the mounting body through such means acting as the supporting carriers. A specific feature is the use of a somewhat flexible shock-receiving part which can be flexed and deformed to accommodate itself in form and position to the surface of the striking door. Still another feature of the invention is the provision of an open space between the mounting body and bumper-part across which space the bumper part moves, and in a portion of which space lies the resilient means.

The resilient means of the present invention may be rubber or may be spring metal or may be both. In my copending application, U. S. Serial No. 670,637, filed May 12, 1933, of which this application is a continuation in part, I have shown both rubber and spring metal, using a coiled compression spring, and also therein I have used the spring in combination with the rubber, and the spring embedded in the rubber.

Where I use rubber composition alone as the resilient means I provide a construction which permits the rubber to expand generally in a plane direction perpendicular to the bumping force. It is well known that rubber is relatively non-compressible when fully confined, and that its resilience is due to elasticity in displacement. For example, when a short column of rubber is compressed endwise, it shortens in the direction of the force but expands circumferentially. In the present invention, where rubber is so used, the space between the mounting body and the buffer part is such as to receive the major portion of the expanding rubber of one or more compressible columns of rubber. The arrangement further is such that the buffer part is not primarily the active resilient member, but, being flexible, it distributes the pressure exerted upon it somewhat uniformly over the active resilient means.

In Figs. 2 and 3 there is shown a bumper which is adapted to be set into the recess 13 of the door post 10. The body part 14 fits into the recess and is adapted to project slightly above the face 11 with rounded edges 15 for neatness of appearance. The body part 14 may be of any material and may be positively secured to the post by known means (not shown) or may be frictionally engaged therein. In the preferred form where it is made of rubber it may be slightly oversized so as to be squeezed into place, the sharp edges of the metal holding it quite positively.

Outside of the socket there is a shock-receiving part 16 with an open space 17 created between it and the body 14, across which space the part 16 moves in its buffer action. In the preferred form the part 16 is of resilient rubber composition and therefore somewhat flexible.

The support for carrying the part 16 extends across a portion of the space 17 between the body 14 and the part 16. The primary support is an annulus of rubber 18 located midway between the ends of the space 17. The rubber annulus on compression is free to expand both towards and away from its center. The thickness of the annulus in part controls the degree of its resilience. Supporting or carrying means is additionally provided at the ends by flexible connections 19 and 20. By being flexible the webs 19 and 20 permit the ends of the part 16 to move inwardly. They serve as ties to prevent undue motion of the ends of part 16 from its normal positions. I prefer to make these connections of resilient rubber and to design them so as to take some of the bumping force. They are shown slightly bowed outwardly so as to impart to the ends a freer play for initial inward motion in the automatic adjustment of the part 16 to an accommodating position. The bowing form directs the ties to move outwardly rather than to move inwardly where they may be pinched. In this form the primary force is to be carried largely by the annulus of rubber, but part of it may be carried by the webs 19 and 20, according to the particulars of the design. Where the parts are not all of integral rubber composition as in the integral form illustrated, suitable means of union may be provided without departing from the spirit and scope of the invention.

In Figs. 4 and 5 a device is shown which is similar to the device of Figs. 2 and 3 with the exceptions that the resilient means is a solid plug or short column of rubber (and not an annulus), and that it is designed to lie flush with the face 11 when inserted into socket 13. It has mounting body 21, shock-receiving part 22, a cylinder or plug of rubber 23, and ties 24. The two ties and plug 23 lie in only a portion of the space 25 between the body 21 and part 22.

In Figs. 6 and 7 the buffer is slightly different in shape for a different shaped socket in a post. There are several resilient spaced columns of support. An integral rubber unit is preferred, but described broadly there is a body 26 adapted to be mounted, a shock-receiving part 27 with an intervening space 28, and supporting compression means consisting of two rubber annuli 29 and 30, end tie webs or columns 31 and 32 of rubber, and a central tie web or column 33 of rubber. Each annulus may be functionally reinforced by embedding therein a coiled metal compression spring (as described in said prior application). The holes 34 and 35 in the annuli extend through the part 27 for certain conveniences in the molding. Pins in the molds are provided on which the coiled springs are held when these are used. The rounded edges 36 indicate a projection of the body 26 from the flush surface 37 of the door jamb.

The form of Figs. 8 and 9 is much like that of Figs. 6 and 7 with the exceptions that it is designed to be flush with the door jamb surface 40, and has solid resilient supporting columns. It has the body 41, the shock-receiving part 42 with intervening space 43, and in a portion of the space, the resilient supporting columns consisting of solid plugs 44 and 45, central web 46, and end ties or webs 47 and 48.

The form of Figs. 10 and 11 is much like the form of Figs. 8 and 9 but is provided with a more equal distribution of the resilient columns. This bumper block is designed to have its face lie flush with the surface 50 of the door jamb. It has body 51, shock-receiving part 52, intervening space 53, and a plurality of rectangular-block-form resilient columns 54, 55, 56, 57 and 58. Each of these columns may expand laterally into the space 53 as it is compressed.

The form of Figs. 12 and 13 is a modified form of the block shown in Figs. 10 and 11. The modifications consist in having the block project slightly from the face 60 of the door jamb, and in having the open space presented in a series of cylindrical holes. The body 61 is spaced from a shock-receiving part 62. The intervening space 63 is occupied by the cylindrical holes and the resultingly shaped columns 64, 65, 66, 67 and 68. One particular feature of the buffers when mounted as shown, is that all the resiliency occurs outside of the door post. Although the body part in the socket may be of resilient rubber, resiliency is not essential, and when so made it deforms little if at all, because the structure is such as to force the deformation to take place in the intervening space where the columns lie. The body parts are depended upon only as mounting means, for the unit, as a carrier for the movable shock-receiving member, and as a resistor for the compression forces on the columns. Where rubber composition is used in a single mold, the whole mass may be of integral and resilient rubber. Resilience in the body may be advantageously utilized merely for squeezing it into position. If desired an integral unit may be made in one mold, with different kinds of composition. The hardness, flexibility and resilience of any part may be controlled by placing suitable compositions at the proper places in the mold. Both the body and the shock-receiving part may be made of hard rubber, lacking resilience, but it is preferred for stated reasons that the shock-receiving part be a flexible one.

Another feature of the construction is the lateral flexibility of the compressible means between the body and the buffer. This permits the buffer and body to be displaced from the normal alinement. Doors in automobiles frequently have a vertical movement relative to the jamb carrying the door buffer. The buffer is free to move with the door on which it presses, relative to the body of the buffer, which is fixed with the jamb. This prevents rubbing of the buffer on the door, or a tendency to tear the buffer where it is not free for such movement. The fact that the holes or spaces side of each column extend clear through the space between the buffer part and the body, permits this lateral movement of the columns.

Although I have shown bumper units mounted in a door post in such a way that all the displacement from buffer action is located outside the door post, it is to be understood that these and similar forms might be made, or might be inserted so that a part of such action takes place within the confines of the post. It is preferred however, to have the action occur outside, because then the mounting body portion is not material to such action. Such parts may be modified without other change in structure to be mounted on a post in other manners leaving the functional parts external to the post.

This application is intended to be generic to the forms shown in my earlier filed case U. S. Serial No. 670,637, filed May 12, 1933.

I claim:

1. A bumper for automobile doors and the like comprising in combination a body portion adapted to be fixedly mounted, a buffer part spaced away from said body portion by an open space, and resilient laterally flexible compressible columnar means extending across a portion of said space secured to said body portion and said buffer part for carrying the buffer part by the body portion and for resisting motion of the buffer part toward said body portion across said space.

2. A bumper for automobile doors and the like comprising in combination a body portion adapted to be fixedly mounted, a buffer part spaced away from said body portion by an open space, and a resilient laterally flexible annulus extending axially across a portion of said space secured to said body portion and said buffer part for carrying the buffer part by the body portion and for resisting motion of the buffer part toward said body portion across said space.

3. A bumper for automobile doors and the like comprising in combination an integral molded unit of rubber having a body portion adapted to be fixedly mounted, a buffer part spaced away from said body portion by an open space, and a plurality of spaced resilient laterally flexible compressible columns connecting said body and said part across said open space, at least said columns being of the resilient type of rubber composition.

4. A bumper for automobile doors and the like comprising in combination an integral molded unit of rubber having a body portion adapted to be fixedly mounted, a buffer part spaced away from said body portion by an open space, and rubber connections between said parts in a portion of said open space for permitting motion of the buffer part toward said body part, at least one of said parts being laterally flexible, columnar and resiliently compressible whereby it is adapted for resisting said motion of the buffer part toward said body portion and being adapted on compression to expand laterally into said open space.

MANDEL KAHN.